United States Patent
Chen et al.

(10) Patent No.: US 9,611,943 B2
(45) Date of Patent: Apr. 4, 2017

(54) WATER OUTPUT CONVERTER

(71) Applicant: Xiamen Runner Industrial Corporation, Xiamen (CN)

(72) Inventors: Xi-Min Chen, Xiamen (CN); Xian-Hai Lin, Xiamen (CN); Rong-Gui Zhang, Xiamen (CN)

(73) Assignee: XIAMEN RUNNER INDUSTRIAL CORPORATION, Xiamen (CN)

( * ) Notice: Subject to any disclaimer, the term of this patent is extended or adjusted under 35 U.S.C. 154(b) by 0 days.

(21) Appl. No.: 14/823,295

(22) Filed: Aug. 11, 2015

(65) Prior Publication Data

US 2016/0091100 A1 Mar. 31, 2016

(30) Foreign Application Priority Data

Sep. 30, 2014 (CN) .......................... 2014 1 0517661

(51) Int. Cl.
*F16K 11/02* (2006.01)
*E03C 1/02* (2006.01)
*F16K 31/122* (2006.01)
*B05B 1/16* (2006.01)
*E03C 1/08* (2006.01)
(Continued)

(52) U.S. Cl.
CPC ............ *F16K 11/02* (2013.01); *B05B 1/1618* (2013.01); *E03C 1/023* (2013.01); *E03C 1/08* (2013.01); *F16K 31/1223* (2013.01); *B05B 1/18* (2013.01); *E03C 2001/0415* (2013.01); *E03C 2201/30* (2013.01); *Y10T 137/2514* (2015.04); *Y10T 137/268* (2015.04)

(58) Field of Classification Search
CPC ........ E03C 1/08; E03C 2201/30; E03C 1/023; E03B 7/07; E03B 7/075; F16K 11/02; F16K 31/1223; Y10T 137/268; Y10T 137/2514; Y10T 137/2516; Y10T 137/2519; Y10T 137/2521; Y10T 137/2683; Y10T 137/87161; Y10T 137/87153; Y10T 137/2665; Y10T 137/2663
See application file for complete search history.

(56) References Cited

U.S. PATENT DOCUMENTS 1,986,206 A * 1/1935 Kennedy ............. F16K 31/1223
137/625.26
2,090,843 A * 8/1937 King ...................... G05D 16/10
137/494
(Continued)

*Primary Examiner* — Kevin Murphy
*Assistant Examiner* — David Colon Morales
(74) *Attorney, Agent, or Firm* — Chun-Ming Shih

(57) ABSTRACT

A water output converter includes a valve body and a valve cock. In the valve body is provided with a first water route and a second water route, while one of the two routes is switched to open or close through the valve cock. Water output of the second water route is controlled through an outside connected switch. The position of the valve cock is adjusted by the outside connected switch through feedback of water pressure in the second water route. When the outside connected switch is switched off, the valve cock is pushed to move upward by the water pressure in the second water route, to open the first water route. When the outside connected switch is switched on, the valve cock is pushed to move downward by the water pressure in the second water route, to close the first water route.

10 Claims, 3 Drawing Sheets

(51) Int. Cl.
*B05B 1/18* (2006.01)
*E03C 1/04* (2006.01)

(56) References Cited

U.S. PATENT DOCUMENTS

| | | | | |
|---|---|---|---|---|
| 2,470,471 A * | 5/1949 | Carleton | F16K 15/063 | 137/513 |
| 2,593,701 A * | 4/1952 | Sanford | G05D 23/1313 | 137/506 |
| 2,949,933 A * | 8/1960 | Moen | F16K 3/18 | 137/119.08 |
| 2,973,001 A * | 2/1961 | McAuley | C02F 1/42 | 137/118.06 |
| 2,990,840 A * | 7/1961 | Marvin Snow | G05D 23/1313 | 137/630.14 |
| 3,317,181 A * | 5/1967 | Robbins, Jr. | F16K 31/1223 | 251/63.4 |
| 3,570,517 A * | 3/1971 | Odenthal | F15B 11/02 | 137/87.06 |
| 3,742,970 A * | 7/1973 | Gross | F15B 20/005 | 116/268 |
| 4,609,006 A * | 9/1986 | Parkison et al. | E03C 1/04 | 137/119.04 |
| 4,610,264 A * | 9/1986 | Georgiev et al. | A01G 25/162 | 137/110 |
| 4,926,897 A * | 5/1990 | Perrott | F16K 11/0746 | 137/98 |
| 5,205,313 A * | 4/1993 | Moretti | F16K 35/14 | 137/112 |
| 5,823,229 A * | 10/1998 | Bertrand | B01D 35/043 | 137/549 |
| 5,884,653 A * | 3/1999 | Orlandi | G05D 23/1313 | 137/100 |
| 6,093,313 A * | 7/2000 | Bovaird | B01D 35/04 | 137/551 |
| 6,135,154 A * | 10/2000 | Chen | B01D 35/04 | 137/625.29 |
| 6,394,124 B1 * | 5/2002 | Wu | F16K 11/02 | 137/119.04 |
| 6,978,795 B2 * | 12/2005 | Perrin | F16K 11/048 | 137/119.04 |
| 7,000,854 B2 * | 2/2006 | Malek | B05B 1/1618 | 137/625.48 |
| 7,077,153 B2 * | 7/2006 | Segien, Jr. | E03C 1/04 | 137/119.01 |
| 7,494,074 B2 * | 2/2009 | Benstead | B05B 1/1618 | 239/11 |
| 7,909,269 B2 * | 3/2011 | Erickson | B05B 1/1618 | 137/801 |
| 2003/0102256 A1 * | 6/2003 | Takagi | B01D 35/04 | 210/101 |
| 2005/0145554 A1 * | 7/2005 | Cunningham | C02F 1/281 | 210/282 |
| 2010/0012197 A1 * | 1/2010 | Liu | E03C 1/023 | 137/119.04 |
| 2010/0155639 A1 * | 6/2010 | Zhou | B05B 1/1609 | 251/213 |
| 2011/0030823 A1 * | 2/2011 | Seal | E03C 1/04 | 137/603 |
| 2013/0153039 A1 * | 6/2013 | Deubler | F16K 31/122 | 137/1 |
| 2013/0167959 A1 * | 7/2013 | Zhou | F16K 11/168 | 137/625.48 |
| 2013/0327431 A1 * | 12/2013 | Zhou | B05B 1/1609 | 137/861 |
| 2014/0054484 A1 * | 2/2014 | Chang | F16K 1/34 | 251/318 |
| 2014/0250586 A1 * | 9/2014 | Zhadanov | B05B 1/16 | 4/615 |

* cited by examiner

WATER OUTPUT CONVERTER

BACKGROUND OF THE INVENTION

Field of the Invention

The present invention relates to a faucet water output switching device, and in particular to a water output converter.

The Prior Arts

Presently, the water output from a faucet is faucet water or purified water. In case two kinds of water output are required at the same time, then a complicated water output switching device has to be used to perform switching, to open or close the respective water input tubes, rather than performing through the water output end, for example, an outside connected switch.

Therefore, presently, the design and performance of the faucet water output switching device is not quite satisfactory, and it leaves much room for improvement.

SUMMARY OF THE INVENTION

In view of the problems and drawbacks of the prior art, the present invention provides a water output converter, to overcome the shortcomings of the prior art.

A major objective of the present invention is to provide a water output converter, that is simple in structure, novel in design, and easy to operate. As such, it is able to realize outputting two kinds of water, and control the switching between two water routes through open or close of one of the water routes by an outside connected switch through feedback.

In order to achieve the objective mentioned above, the present invention provides a water output converter, comprising: a valve body and a valve cock. In the valve body is provided with a first water route and a second water route. One of the first water route and the second water route is switched to open or close through using the valve cock. The water output of the second water route is controlled through an outside connected switch. The position of the valve cock is adjusted by the outside connected switch through feedback of water pressure in the second water route. When the outside connected switch is switched off, the valve cock is pushed to move upward by the water pressure in the second water route, to open the first water route. When the outside connected switch is switched on, the valve cock is pushed to move downward by the water pressure in the second water route, to close the first water route.

The first water route is formed by a first water input channel on the upper portion of the valve body, and a first water output channel; while the second water route is formed by a second water input channel on the lower portion of the valve body, and a second water output channel. The valve cock is placed between the first water output channel and second water output channel connected in communication with each other. When the valve cock is in a position of an upper stop point, the first water input channel and the first water output channel are connected in communication with each other. When the valve cock is in a position of a lower stop point, the second water input channel and the second water output channel are connected in communication with each other.

On the upper end of the valve cock is provided with a first protrusion ring portion, that is provided with a first ring slot. In the first ring slot is provided with a first O-shape seal ring blocking and separating the first water input channel and the first water output channel. In a central portion of the valve cock is provided with a central protrusion ring portion, in which is provided with a central ring slot. In the central ring slot is provided with a central O-shape seal ring blocking and separating the first water output channel and the second water output channel.

The cross section of the central protrusion ring portion is greater than that of the first protrusion ring portion.

At the lower end of the valve cock is provided with a second protrusion ring portion, that is provided with a second ring slot. A plurality of water holes are provided evenly on the second protrusion ring portion around the perimeter of the second ring slot. In the second ring slot is provided with a one way seal ring blocking and separating the second water input channel and the second water output channel.

The first water output channel and the second water output channel are vertically disposed, and are connected to each other through a middle channel. The first water input channel and the second water input channel are disposed laterally and are not connected to each other.

In the valve body is provided with the steps for positioning the upper stop point of the valve cock. In the lower end of the second water output channel is provided with sleeve for positioning the lower stop point of the valve cock.

The water input ports of the first water input channel and the second water input channel are each provided with an outer thread connector. The water output ports of the first water output channel and the second water output channel are each provided with an outer thread connector.

The first water route is a faucet water route, while the second water route is a purified water route.

Compared with the Prior Art, the water output converter of the present invention has the following advantages: compact in construction, novel in design, and easy to control and operate. As such, it can realize the function of outputting two kinds of water, such as faucet water and purified water, to control move-up and move-down of the valve cock, through open or close of an outside connected switch in the second water route by means of feedback, in achieving switching between two water input routes.

Further scope of the applicability of the present invention will become apparent from the detailed descriptions given hereinafter. However, it should be understood that the detailed descriptions and specific examples, while indicating preferred embodiments of the present invention, are given by way of illustration only, since various changes and modifications within the spirit and scope of the present invention will become apparent to those skilled in the art from this detailed descriptions.

BRIEF DESCRIPTION OF THE DRAWINGS

The related drawings in connection with the detailed descriptions of the present invention to be made later are described briefly as follows, in which.

DETAILED DESCRIPTION OF THE PREFERRED EMBODIMENT

The purpose, construction, features, functions and advantages of the present invention can be appreciated and understood more thoroughly through the following detailed description with reference to the attached drawings.

Figure 1:
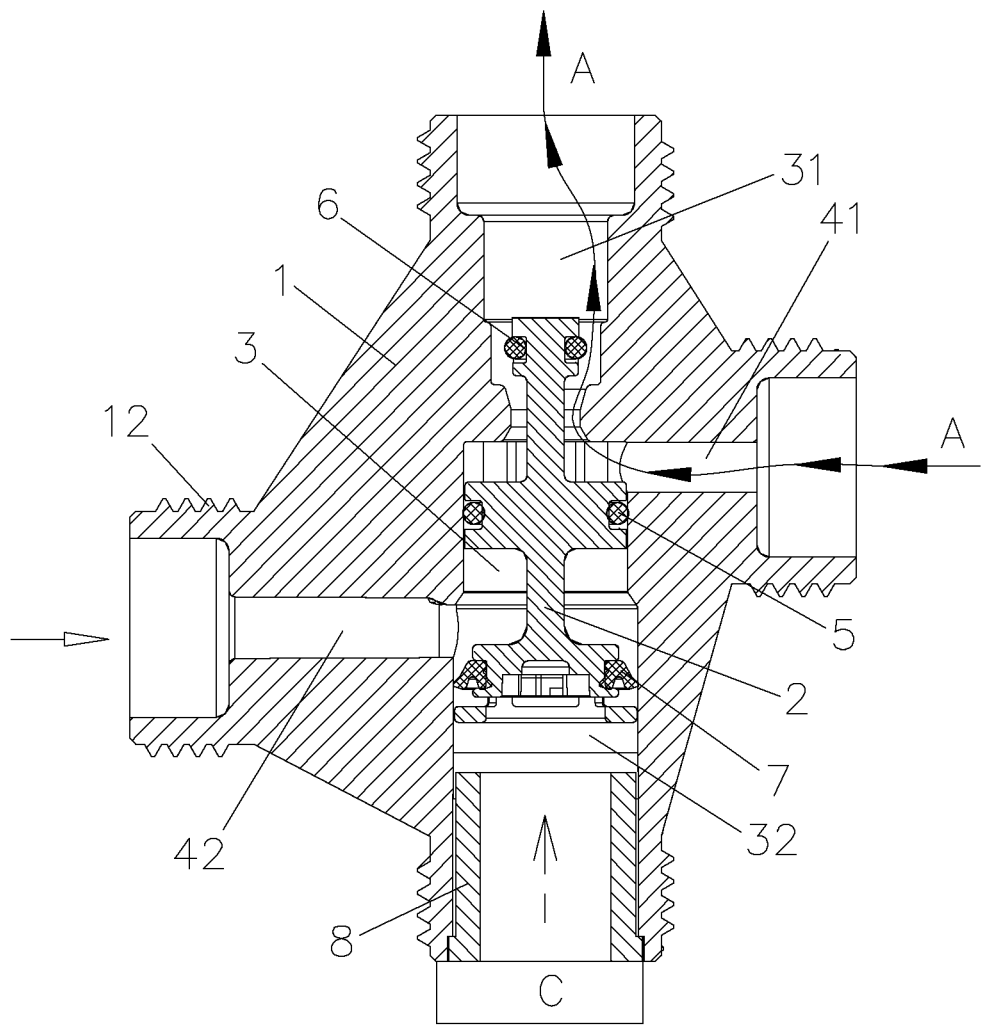
FIG. 1 is a schematic diagram of a water output for a first water route of a water output converter according to an embodiment of the present invention.
Figure 2:
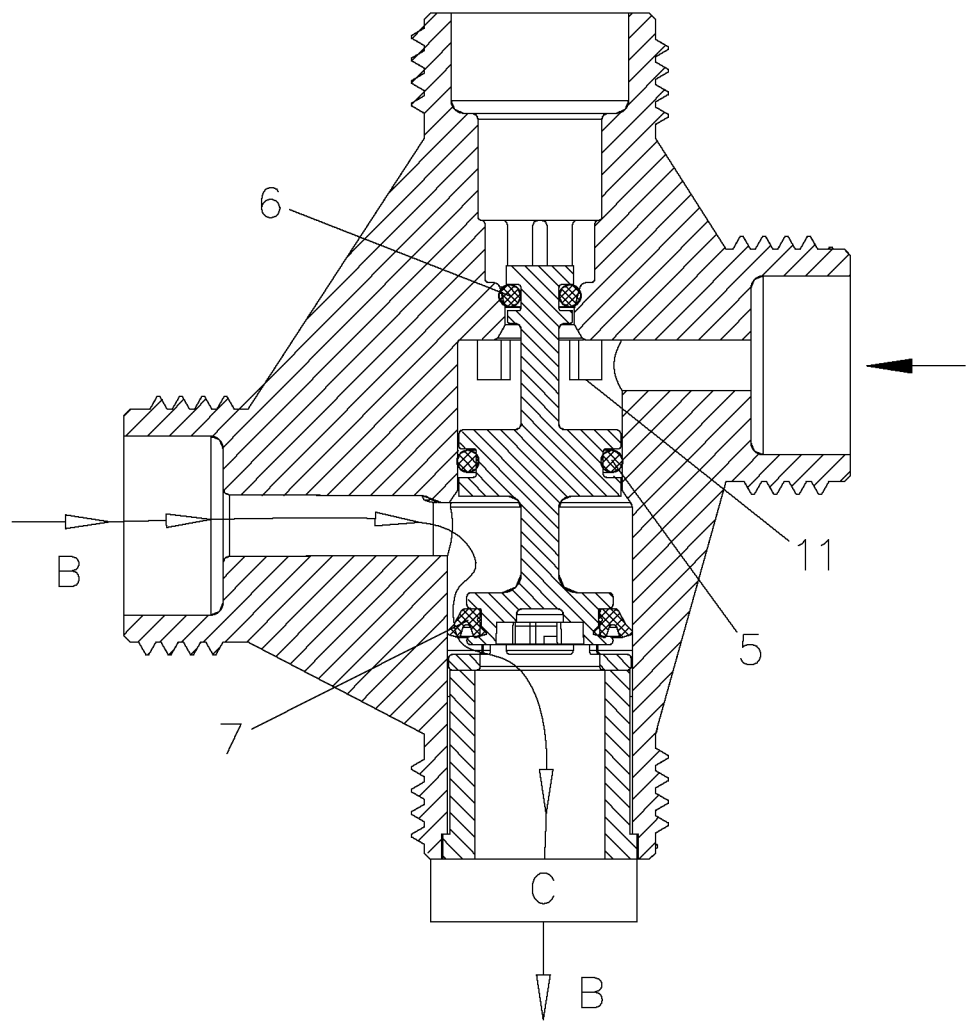
FIG. 2 is a schematic diagram of a water output for a second water route of a water output converter according to an embodiment of the present invention.
Figure 3:
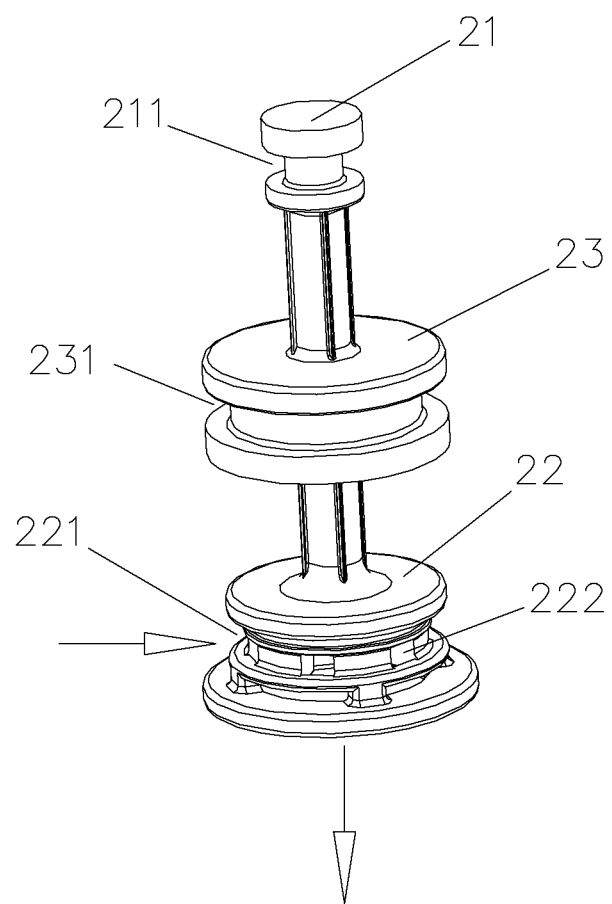
FIG. 3 is a schematic diagram of a valve cock for a water output converter according to an embodiment of the present invention.

Firstly, refer to FIGS. 1 to 3 for a schematic diagram of a water output for a first water route of a water output converter according to an embodiment of the present invention; a schematic diagram of a water output for a second water route of a water output converter according to an embodiment of the present invention; and a schematic diagram of a valve cock for a water output converter according to an embodiment of the present invention.

As shown in FIGS. 1 to 3, the water output converter includes a valve body 1 and a valve cock 2. In the w valve body 1 is provided with a first water route A and a second water route B. One of the first water route A and the second water route B is switched to open or close through the valve cock 2. The water output of the second water route B is controlled through an outside connected switch C. The position of the valve cock 2 is adjusted by the outside connected switch C through feedback of water pressure in the second water route B. When the outside connected switch C is switched off, the valve cock 2 is pushed to move upward by the water pressure in the second water route B, to open the first water route A. When the outside connected switch C is switched on, the valve cock 2 is pushed to move downward by the water pressure in the second water route B, to close the first water route A.

When the outside connected switch C is switched off, the second water route B exerts an upward water pressure on the valve cock 2, that is greater than the downward water pressure exerted on the valve cock 2 by the first water route A. Therefore, the water pressure in the second water route B pushes the valve cock 2 to move upward, to open the first water route A. When the outside connected switch C is switched on, due to the release of pressure, the valve cock 2 is exerted a downward water pressure in the first water route A. Therefore, the water pressure in the first water route A pushes the valve cock 2 to move downward, to close the first water route A.

In the present embodiment, the first water route A is formed by a first water input channel 41 on the upper portion of the valve body 1, and a first water output channel 31; while the second water route B is formed by a second water input channel 42 on the lower portion of the valve body 1, and a second water output channel 32. The valve cock 2 is placed between the first water output channel 31 and second water output channel 32 connected in communication with each other. When the valve cock 2 is in a position of the upper stop point, the first water input channel 41 and the first water output channel 31 are connected in communication with each other. When the valve cock 2 is in a position of the lower stop point, the second water input channel 42 and the second water output channel 32 are connected in communication with each other.

In the present embodiment, the first water output channel 31 and the second water output channel 32 are vertically disposed, and are connected to each other through a middle channel 3. The first water input channel 41 and the second water input channel 42 are disposed laterally and are not connected to each other.

In the present embodiment, on the upper end of the valve cock 2 is provided with a first protrusion ring portion 21, that is provided with a first ring slot 211. In the first ring slot 211 is provided with a first O-shape seal ring 6 blocking and separating the first water input channel 41 and the first water output channel 31. When the outside connected switch C in the second water route B is switched on, the valve cock 2 is kept in the position of its lower stop point and remains there, due to its own weight, the water pressure difference in the first water route A, and the downward thrust of water flow in the second water route B. At this time, the first O-shape seal ring 6 blocks and separates the first water input channel 41 and the second water output channel 32, such that the first water route A formed by the first water input channel 41 and the second water output channel 32 is closed.

In the present embodiment, in the central portion of the valve cock 2 is provided with a central protrusion ring portion 23, in which is provided with a central ring slot 231. In the central ring slot 231 is provided with a central O-shape seal ring 5 blocking and separating the first water output channel 31 and the second water output channel 32. Regardless the valve cock 2 is moving upward and downward, the central O-shape seal ring 5 reliably divides the first water output channel 31 and the second water output channel 32.

In the present embodiment, in order to make the valve cock 2 move downward quickly when the outside connected switch C is switched on, the cross section of the central protrusion ring portion 23 is greater than that of the first protrusion ring portion 21. When the outside connected switch C is switched on, the downward force exerted by the water flow in the first water route A on the central protrusion ring portion 23 is greater than the upward force exerted on the first protrusion ring portion 21 by the water flow in the first water route A. Namely, the first water route A1 exerts downward water pressure on the valve cock 2.

In the present embodiment, at the lower end of the valve cock 2 is provided with a second protrusion ring portion 22, that is provided with a second ring slot 221. In the second ring slot 221 is provided with a one way seal ring 7 blocking and separating the second water input channel 42 and the second water output channel 32. When outside connected switch C in the second water route B formed by the second water input channel 42 and the second water output channel 32 is switched off, the water pressure in the second water output channel 32 keeps increasing, thus making the one way seal ring 7 separate and block the second water input channel 42 and the second water output channel 32, then it makes the valve cock 2 move upward till it reaches the position of the upper stop point and remain there. At this time, the first O-shape seal ring 6 does not block the first water input channel 41 and the second water output channel 32, such that the first water route A formed by the first water input channel 41 and the second water output channel 32 is opened.

In the present embodiment, a plurality of water holes 222 are provided evenly on the second protrusion ring portion 22 around the perimeter of the second ring slot 221. When water is output from the second water route B, namely, the outside connected switch C in the second water route B is switched on, the water flow coming in from the second water input channel 42 will press downward the outer rim of the one way seal ring 7 to retract inward gradually, such that water will flow from the water holes 222 into the second water output channel 32, and it will finally flow out from the outside connected switch C. When water is not output from the second water route B, namely the outside connected switch C of the second water route B is switched off, then the water accumulated in the second water output channel 32 will flow through the water holes 222, to push the outer rim of the one way seal ring 7 upward to expand gradually outward, such that the water pressure in the second water output channel 32 will push the valve cock 2 to move upward gradually, till it reaches the position of the upper stop point.

In the present embodiment, in the lower end of the second water output channel 32 is provided with sleeve 8 for positioning the lower stop point of the valve cock 2. The lower end of the sleeve 8 is provided with step face in cooperation with the positioning of the valve body 1. The outer perimeter of the sleeve 8 and the inner side of the second water output channel 32 are in interference fit or thread gap fit. During installation, the valve cock 2 is placed in from the lower end of the second water output channel 32 of the valve body 1, and then install the sleeve 8. In the valve body 1 is provided with the steps 11 for positioning the upper stop point of the valve cock 2. The valve cock 2 is pushed by the water pressure in the second water output channel 32 to move upward, until the upper end surface of the central protrusion ring portion 23 presses against the steps 11. The steps 11 are located above the middle channel 3.

In the present embodiment, in order to facilitate connecting to the two water input tubes, the water input ports of the first water input channel 41 and the second water input channel 42 are each provided with an outer thread connector 12, and of course it can be an inner thread connector. Also, in order to facilitate connecting to the two water output tubes, the water output ports of the first water output channel 31 and the second water output channel 32 are each provided with an outer thread connector 12, and of course it can be an inner thread connector. The first water route A formed by the first water input channel 41 and the first water output channel 31 is a faucet water route, while the second water route B formed by the second water input channel 42 and the second water output channel 32 is a purified water route. Both the faucet water and the purified water can be supplied continuously as input water to the output water converter, but only one of the faucet water and the purified water is selected as the output water. To be more specific, the outside connected switch C is used to switch and determine water output is faucet water or purified water, through the feedback of water pressure back to the water output converter.

The above detailed description of the preferred embodiment is intended to describe more clearly the characteristics and spirit of the present invention. However, the preferred embodiments disclosed above are not intended to be any restrictions to the scope of the present invention. Conversely, its purpose is to include the various changes and equivalent arrangements which are within the scope of the appended claims.

What is claimed is:

1. A water output converter, comprising:
   a valve body, in which is provided with a first water route and a second water route, one of the first water route and the second water route is switched to open or close through using a valve cock, the water output of the second water route is controlled through an outside connected switch;
   wherein a position of the valve cock is adjusted by the outside connected switch through utilizing feedback of water pressure in the second water route, when the outside connected switch is switched off, the valve cock is pushed to move upward by water pressure in the second water route, to open the first water route, when the outside connected switch is switched on, the valve cock is pushed to move downward by water pressure in the first water route, to close the first water route;
   wherein the first water route is formed by a first water input channel on an upper portion of the valve body, and a first water output channel; while the second water route is formed by a second water input channel on a lower portion of the valve body, and a second water output channel; on an upper end of the valve cock is provided with a first protrusion ring portion, that is provided with a first ring slot, in the first ring slot is provided with a first O-shape seal ring blocking and separating the first water input channel and the first water output channel; in a central portion of the valve cock is provided with a central protrusion ring portion, in which is provided with a central ring slot, and in the central ring slot is provided with a central O-shape seal ring blocking and separating the first water output channel and the second water output channel.

2. The water output converter as claimed in claim 1, wherein the valve cock is placed between the first water output channel and second water output channel connected in communication with each other; when the valve cock is in a position of an upper stop point, the first water input channel and the first water output channel are connected in communication with each other; when the valve cock is in the position of a lower stop point, the second water input channel and the second water output channel are connected in communication with each other.

3. The water output converter as claimed in claim 1, wherein a cross section of the central protrusion ring portion is greater than that of the first protrusion ring portion.

4. The water output converter as claimed in claim 1, wherein at a lower end of the valve cock is provided with a second protrusion ring portion, that is provided with a second ring slot; a plurality of water holes are provided evenly on the second protrusion ring portion around a perimeter of the second ring slot; in the second ring slot is provided with a one way seal ring blocking the second water input channel and the second water output channel.

5. The water output converter as claimed in claim 3, wherein at a lower end of the valve cock is provided with a second protrusion ring portion, that is provided with a second ring slot; a plurality of water holes are provided evenly on the second protrusion ring portion around a perimeter of the second ring slot; in the second ring slot is provided with a one way seal ring blocking the second water input channel and the second water output channel.

6. The water output converter as claimed in claim 1, wherein the first water output channel and the second water output channel are vertically disposed, and are connected to each other through a middle channel; while the first water input channel and the second water input channel are disposed laterally and are not connected to each other.

7. The water output converter as claimed in claim 1, wherein water input ports of the first water input channel and the second water input channel are each provided with a thread connector; while water output ports of the first water output channel and the second water output channel are each provided with the thread connector.

8. The water output converter as claimed in claim 1, wherein the first water route is a faucet water route, while the second water route is a purified water route.

9. A water output converter, comprising:
   a valve body, in which is provided with a first water route and a second water route, one of the first water route and the second water route is switched to open or close through using a valve cock, the water output of the second water route is controlled through an outside connected switch;
   wherein a position of the valve cock is adjusted by the outside connected switch through utilizing feedback of water pressure in the second water route, when the outside connected switch is switched off, the valve cock is pushed to move upward by water pressure in the second water route, to open the first water route, when the outside connected switch is switched on, the valve cock is pushed to move downward by water pressure in the first water route, to close the first water route;

wherein the first water route is formed by a first water input channel on an upper portion of the valve body, and a first water output channel; while the second water route is formed by a second water input channel on a lower portion of the valve body, and a second water output channel; the valve cock is placed between the first water output channel and second water output channel connected in communication with each other; when the valve cock is in a position of an upper stop point, the first water input channel and the first water output channel are connected in communication with each other; when the valve cock is in the position of a lower stop point, the second water input channel and the second water output channel are connected in communication with each other;

wherein in the valve body is provided with a plurality of steps for positioning the upper stop point of the valve cock;

and in the lower end of the second water output channel is provided with a sleeve for positioning the lower stop point of the valve cock.

10. A water output converter, comprising:

a valve body provided with a first water route and a second water route, one of the first water route and the second water route being switched to open or close through using a valve cock, a first water chamber being formed between the first water route and the valve cock, a second water chamber being formed between the second water route and the valve cock, the first water chamber and the second water chamber being separated by the valve cock and non-communicating with each other, the water output of the second water route being controlled through an outside connected switch, a position of the valve cock being adjusted by the outside connected switch through utilizing feedback of water pressure in the second water route, when the outside connected switch is switched off, the valve cock is pushed to move upward by water pressure in the second water route, to open the first water route, when the outside connected switch is switched on, the valve cock is pushed to move downward by water pressure in the first water route, to close the first water route, wherein the first water route is formed by a first water input channel and a first water output channel; the second water route is formed by a second water input channel and a second water output channel, and wherein the first water input channel and the second water input channel are disposed non-coaxially.

* * * * *